(12) United States Patent
Granjeon et al.

(10) Patent No.: US 9,971,061 B2
(45) Date of Patent: May 15, 2018

(54) SEDIMENTARY BASIN DEVELOPMENT METHOD USING STRATIGRAPHIC SIMULATION COUPLED WITH AN ORGANIC MATTER PRODUCTION AND DEGRADATION MODEL

(71) Applicant: IFP Energies Nouvelles, Rueil-Malmaison (FR)

(72) Inventors: Didier Granjeon, Rueil-Malmaison (FR); Benoit Chauveau, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 705 days.

(21) Appl. No.: 14/087,302

(22) Filed: Nov. 22, 2013

(65) Prior Publication Data
US 2014/0163883 A1    Jun. 12, 2014

(30) Foreign Application Priority Data
Dec. 12, 2012    (FR) ..................... 12 03389

(51) Int. Cl.
*G01V 99/00*    (2009.01)
(52) U.S. Cl.
CPC ...... *G01V 99/005* (2013.01); *G01V 2210/661* (2013.01)
(58) Field of Classification Search
CPC ........... G01V 99/005; G01V 2210/661; G01V 11/00; G06T 17/05
See application file for complete search history.

(56) References Cited

U.S. PATENT DOCUMENTS

| 7,043,367 | B2 | 5/2006 | Granjeon |
| 2002/0013687 | A1 | 1/2002 | Ortoleva |
| 2006/0136162 | A1* | 6/2006 | Hamman ............... G01V 1/306 |
| | | | 702/104 |
| 2010/0175886 | A1* | 7/2010 | Bohacs ................. G01V 99/00 |
| | | | 166/369 |

(Continued)

FOREIGN PATENT DOCUMENTS

FR    2 849 211    12/1920

OTHER PUBLICATIONS

Mann, Ute et al: (2008) "Modelling Source-Rock Distribution and Quality Variations: The Organic Facies Modelling Approach", In Analogue and Numerical Forward Modelling of Sedimentary Systems; from Understanding to Prediction (P.L. de Boer, et al). Special Publication 40 of the International Association of Sedimentologists, pp. 239-274.

(Continued)

*Primary Examiner* — Manuel L Barbee
(74) *Attorney, Agent, or Firm* — Fitch, Even, Tabin & Flannery LLP

(57) ABSTRACT

The invention is a method of developing a sedimentary basin wherein the distribution and the quality of the organic matter in the sedimentary basin are determined using stratigraphic modelling representing the evolution of the sedimentary basin. The method is based on the coupling of a stratigraphic model with an organic matter production, transport and degradation model. The sedimentary basin is then developed according to the distribution and the quality of the organic matter.

37 Claims, 7 Drawing Sheets

(56) References Cited

U.S. PATENT DOCUMENTS

2010/0228485 A1 9/2010 Betancourt et al.
2011/0264430 A1 10/2011 Tapscott et al.

OTHER PUBLICATIONS

Parasnis, D. S.: (1960) "The compaction of Sediments and Its Bearing on Some Geophysical Problems", Journal of the Royal Astronomical Society, V. 3, No. 1, pp. 1-28 (Received Apr. 20, 1959).
Lawrence, David T. et al: (1990) "Stratigraphic Simulation of Sedimentary Basins : Concepts and Calibration" in Amer. Assoc. Petrol. Geol. Bull., vol. 74, No. 3, 273-295. (Mar. 1990).
Martin, J. H. et al: (1987) "VERTEX : Carbon Cycling in the Northeast Pacific." Deep-Sea Research, vol. 34, No. 2, pp. 267-285.
Betts, J. N. et al: (1991) "The Oxygen Content of Ocean Bottom Waters, the Burial Efficiency of Organic Carbon, and the Regulation of Atmospheric Oxygen", in Palaeogeography, Palaeoclimatology, Paleoecology (Global and Planetary Change Section), 97 (1991) pp. 5-18, Elsevier Science Publishers.
Aller, Robert C.: (1998) "Mobile Deltaic and Continental Shelf Muds as Suboxic, Fluidized Bed Reactors". Marine Chemistry 61 (1998), pp. 143-155.

* cited by examiner

SEDIMENTARY BASIN DEVELOPMENT METHOD USING STRATIGRAPHIC SIMULATION COUPLED WITH AN ORGANIC MATTER PRODUCTION AND DEGRADATION MODEL

CROSS REFERENCE TO RELATED APPLICATION

Reference is made to French Patent Application Serial No. 12/03.389, filed on Dec. 12, 2012, which application is incorporated herein by reference in its entirety.

BACKGROUND OF THE INVENTION

Field of the Invention

The invention relates to petroleum, notably oil exploration through the study of sedimentary basins.

Description of the Prior Art

The major current trends in oil exploration are:
moving towards increasingly complex zones (mountain range foothills, ultra-deep marine zones, etc.), optimizing recovery from already discovered reservoirs, and searching for new resources (shale gas and oil, etc.).

In order to meet these three objectives, it is important to best characterize the distribution of sediments in a sedimentary basin and, in particular, the distribution and the quality of the organic matter within these sediments, controlled by the deposition, degradation and/or preservation processes relative to this organic matter. Good characterization of organic matter-rich sedimentary layers thus requires good understanding of the stratigraphy of the basin that is the geometry of the sedimentary layers, the distribution of the fine and coarse sediments within these layers and the impact of the filling dynamics on the final distribution and the quality of the organic matter.

The objective of stratigraphic modelling is to simulate the evolution of a sedimentary basin over geologic times in order to quantify the geometry of the sedimentary layers, the grain size of the sediments, the water depth at the time of the deposition, etc. Harbaugh and Bonham-Carter's pioneering work (1970) has provided an outline of this process-oriented numerical modelling. Several 3D stratigraphic models have been developed since: SEDSIM™ (CSIRO, Australia) and DIONISOS™ (IFP Energies nouvelles, France) for example. The scope of application (time and space scales) can be different depending on the model. Thus, only DIONISOS allows modelling all the deposited environment types over scales of several million years. FIG. 1 shows the iterative stages of a stratigraphic simulation as described in French Patent Application 2,849,211 corresponding to U.S. Pat. No. 7,043,367. These various models are however based on the same methodology and they generally account for the three main processes, shown in FIG. 1 which are the creation (or elimination) of space available for sedimentation by tectonic, eustatic and flexural movements;

the sediment supply to the basin, either through boundaries, or through the agency of in-situ production or precipitation; and the transport of these sediments in the available created space, which can be permanent sediment transport, episodic sediment transport and/or catastrophic sediment transport.

A new stratigraphy is then determined by use of the mass conservation principle.

These stratigraphic models are tools used in order to better understand the sedimentary architecture of a basin. For the petroleum industry, this is in fine better constrains the organic matter preferential deposition zones or the structural traps where petroleum and/or gas might be stored. However, none of these stratigraphic models involves a module accounting for the production, transport and degradation of the organic matter in order to estimate the organic matter distribution during filling of the sedimentary basin.

In the early 1990s, tools for predicting the organic matter content of sediments have been developed (for example Carbolog, Carpentier et al., 1991). However, estimations were made only in wells and solely using logs. These methods are thus inapplicable on the scale of a sedimentary basin and do not take into account of the real basin dynamics (notably organic matter transport) but only account for the final state thereof as shown by logs.

Considerable work has emphasized the need to take into account the filling kinematics of a basin in order to better assess the organic matter distribution. Carpentier et al. (1993) provided a filling model (SIMSALT) for the Mulhouse basin by combining evaporite deposition and organic matter sedimentation. However, this model only accounts for the organic matter production and the evaporite precipitation, while disregarding transport and degradation processes.

Furthermore, independent organic matter production and degradation models have been developed. For example, the Of-Mod™ model (SINTEF, Norway) allows prediction of the distribution and the quality of organic matter in stratigraphic sequences. This model is notably described in the following document: Mann, U. and Zweigel, J., (2008). Modelling Source Rock Distribution and Quality Variations: The Of-Mod approach. In: Analogue and Numerical Forward Modelling of Sedimentary Systems; from Understanding to Prediction (P. L. de Boer, G. Postma, C. J. van der Zwan, P. M. Burgess and P. Kukla, eds). Special Publication 40 of the International Association of Sedimentologists, pp. 239-274. This model is used by the petroleum industry for estimating the organic matter distribution in sedimentary basins. It requires a 3D numerical model of the sedimentary basin under study, provided by a stratigraphic model or a geomodeller, and it quantifies the organic carbon content of sediments by simulating the organic matter production and degradation in marine domains. This model however disregards transport processes and the interactions between production, transport and degradation. Indeed, with this model, consideration is given to the marine organic matter settling vertically into the production zone thereof (that is without transport), and that the terrestrial organic matter "sticks" to the terrigenous clastic sediments whose distribution has to be provided as an input parameter of the Of-Mod™ model.

SUMMARY OF THE INVENTION

The invention is a method of developing a sedimentary basin wherein the distribution and quality of the organic matter in the sedimentary basin is determined using stratigraphic modelling representing the evolution of the sedimentary basin. The method is based on the coupling of a stratigraphic model with an organic matter production, transport and degradation model. The invention enables characterization of the geometry and of the nature of the organic matter-rich sedimentary layers (mother rocks, gas and oil shale, etc.) making up a sedimentary basin, in particular for petroleum exploration during the study of boundary zones, the evaluation of new fields, petroleum potential characterization and the search for new resources (shale gas, etc.).

The invention relates to a method of developing a sedimentary basin wherein an image quantifying hydrocarbon potential of the sedimentary basin is constructed. This method comprises the following:

a) breaking up the sedimentary basin into geologic layers with each geologic layer corresponding to a sediment deposition for a given time period;

b) determining the composition of the geologic layers through coupling of a stratigraphic simulation with an organic matter production and degradation model;

c) quantifying the hydrocarbon potential of the geologic layers of the sedimentary basin from said composition; and d) developing the sedimentary basin according to the quantification.

According to the invention, the composition of the geologic layers is determined using an iterative stratigraphic simulation, from the past to a more recent time, within each geologic layer, by use of a stratigraphic model and of an organic matter production and degradation model, by carrying out the following:

i) determining the production of the organic matter within the geologic layer using the organic matter production and degradation model;

ii) modelling the transport of the sediments and of the organic matter produced using the stratigraphic model;

iii) determining the degradation of the organic matter during the transport using the organic matter production and degradation model;

iv) determining the stratigraphy of the basin by accounting for the mass conservation by use of the sediment transport and the organic matter degradation; and v) determining the organic matter degradation within the stratigraphy using the organic matter production and degradation model.

Advantageously, the stratigraphic simulation, the sediments and the organic matter are described by use of a finite number of sediment and organic matter classes.

According to an embodiment of the invention, the hydrocarbon potential is quantified by determining an organic carbon content (OCC) in each geologic layer and/or by determining hydrogen indices (HI) and/or oxygen indices (OI) and/or by determining the mineralogy of the sediments within each geologic layer.

Advantageously, the production of the organic matter is determined by accounting for a nutrient distribution estimation by the stratigraphic model.

Preferably, the organic matter production in at least one marine or lacustrine domain is determined from an equation of the type as follows:

$$PP_k(z) = PP_{0,k}\left(\frac{z}{z_0}\right)^{-nk}$$

if $z > z_0$, otherwise $PP_k(z) = PP_{0,k}$ with $PP_k$ being the sediment flux of class k reaching a sea bottom, z being the depth of the sea or lacustrine bottom, $z_0$ being the depth of the photic zone of the aquatic medium, $n_k$ being a constant specific to organic sediment class k and $PP_0$ being the primary production rate defined by $PP_{0,k} = a_{1,k} Q_{nutriment}^{b1,k}$ with $Q_{nutriment}$ being the nutrient supply and $a_{1,k}$ and $b_{1,k}$ being constants specific to sediment class k.

Moreover, the organic matter production in peat bogs can be determined from an equation of the type as follows:

$$PP_k(z) = PP_{0,k}\left(\frac{z}{z_0}\right)^{-nk}$$

if $z > z_0$, otherwise $PP_k(z) = PP_{0,k}$ with $PP_k$ being the sediment flux of class k reaching the bottom of the peat bog, z being the depth of the peat bog, $z_0$ being the depth of the photic zone of the aquatic medium, $n_k$ being a constant specific to the organic sediment of class k and $PP_0$ being the primary production rate defined by $PP_{0,k} = a_{2,k} Q_{eau}^{b2,k}$ with being $Q_{eau}$ the water flux, and $a_{2,k}$ and $b_{2,k}$ being constants specific to sediment class k.

According to the invention, the degradation of the organic matter is determined by determining an organic matter burial efficiency by:

(1) determining a water oxygenation factor;

(2) determining an organic matter burial efficiency in oxidation zones and an organic matter burial efficiency in reduction zones by use of the water oxygenation factor; and (3) determining the organic matter burial efficiency by use of the organic matter burial efficiency in oxidation and reduction zones.

Advantageously, the water oxygenation factor Ox is determined using a formula of the type as follows: $Ox = Ox_{topo} \cdot Ox_{conso}$ with $Ox_{topo}$ being the topographic oxygenation factor and $Ox_{conso}$ being the oxygen consumption factor, $Ox_{topo}$ being defined by a relation of the type as follows:

$$Ox_{topo} = a_3\left(\frac{A^{\frac{1}{2}}}{H_{max}}\right)^{b_3}$$

with A being the surface area of the aquatic medium, $H_{max}$ being the maximum depth of the aquatic medium, $a_3$ and $b_3$ being specific constants, and $Ox_{conso}$ being defined by a relation of the type as follows: $Ox_{conso} = 1$ if $PP < PP_{min}$ otherwise $$Ox_{conso} = \left(\frac{PP_{min}}{PP}\right)^{b_4}$$

with PP being the sum of the production rates $PP_k$ of each organic sediment class k, $PP_{min}$ being the total primary production threshold and $b_4$ being a constant.

The organic matter burial efficiency $BE_{Ox,k}$ in oxidation zones can be determined using a formula of the type as follows: $BE_{Ox,k} = (a_{Ox,k} + b_{Ox,k} \cdot Z_{Ox} \cdot v_s)^{n_{Ox,k}}$ with $v_s$ being the sedimentation rate, $a_{Ox,k}$, $b_{Ox,k}$ and $n_{Ox,k}$ being constants, $Z_{Ox}$ being the oxygen penetration distance defined by a formula of the type as follows: $Z_{Ox} = Z_0 \cdot Ox$ with $Z_0$ being the maximum depth of the aquatic medium.

Furthermore, the organic matter burial efficiency $BE_{Red,k}$ in reduction zones can be determined using a formula of the type as follows: $BE_{Red,k} = (a_{Red,k} + b_{Red,k} \cdot v_s)^{n_{Red,k}}$ with $v_s$ being the sedimentation rate and $a_{Red,k}$, $b_{Red,k}$ and $n_{Red,k}$ being constants.

Advantageously, organic matter burial efficiency $BE_k$ is determined using a relation of the type as follows: $BE_k = BE_{Ox,k} \cdot BE_{Red,k}$.

Preferably, the hydrogen index is determined using a formula of the type as follows:

$$IH = \sum_{k=1}^{N} c_k \cdot IH_k \cdot BE_{Ox,k}^{i1,k} \cdot BE_{Red,k}^{i2,k}$$

with IH being the final hydrogen index, N being the number of sediment and organic matter classes, $c_k$ being the mass fraction of organic matter k, $IH_k$ being the initial hydrogen index of sediment class k, $BE_{Ox,k}$ and $BE_{Red,k}$ being the burial efficiency for organic matter k, and i1 and i2 being constants specific to each sediment class k.

The invention also relates to a computer program product downloadable from a communication network and/or recorded on a computer-readable medium and/or processor executable, comprising program code instructions for implementing the method as described above when the program is executed on a computer.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

Figure 1:
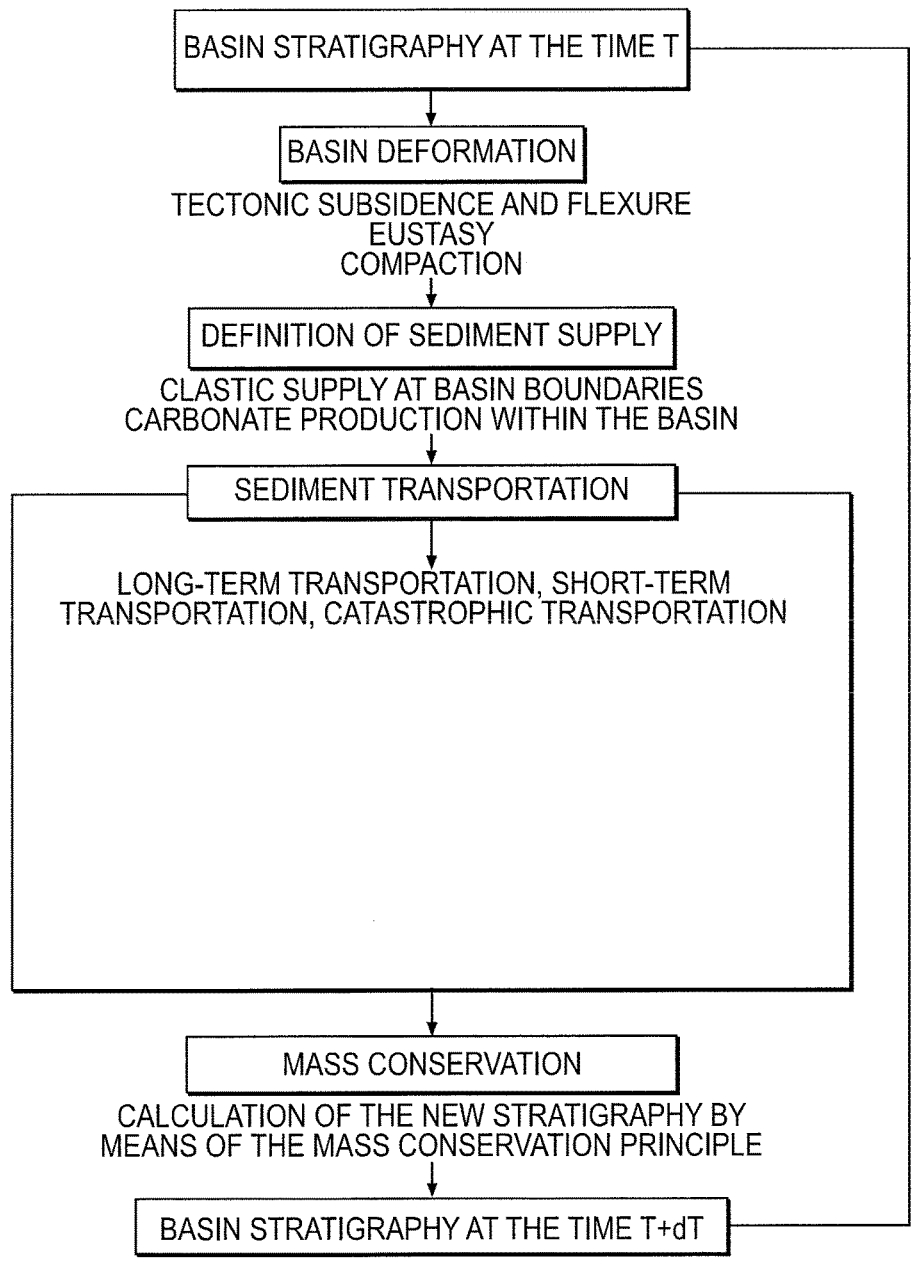
FIG. 1, already described, illustrates the iterative stages of a stratigraphic simulation according to the prior art.

The invention relates to a method of developing a sedimentary basin wherein an image quantifying a hydrocarbon potential is constructed using a stratigraphic model coupled with an organic matter production, transport and degradation model.

It should be noted that a stratigraphic model is a numerical model whose purpose is to simulate the evolution of a sedimentary basin over geologic times in order to quantify the geometry of the sedimentary layers, the grain size of the sediments, and the water depth at the time of the deposition, etc. Such a model generally accounts for three major processes which are the creation (or elimination) of space available for sedimentation by tectonic, eustatic and flexural movements, the sediment supply to the basin, either through boundaries, or through the agency of in-situ production or precipitation, and the transport of these sediments in the available space created. A new stratigraphy is then determined by use of the mass conservation principle. The SEDSIM™ (CSIRO, Australia) and DIONISOS™ (IFP Energies nouvelles, France) models are examples of stratigraphic models. According to the invention, the stratigraphic model enables studies over considerable time and space scales (duration of the order of some thousand years to some hundred million years, horizontal distance of the order of several dozen to several hundred kilometers).

An organic matter production, transport and degradation model is understood to be a numerical model allowing determination of the organic matter produced, displaced and degraded during the formation of geologic layers. In the emerged domain, the organic matter is derived from plants (leaves and wood debris, algae in lakes, etc.). In the marine domain, the organic matter comes from plankton, recycled by marine animals as fecal pellets, and also from sea plants (algae). Bacteria can also contribute thereto in form of microbial mats. These are only examples. Organic matter is derived from any living organism, unlike mineral matter. The Of-Mod™ (SINTEF, Norway) model is an example of an organic matter production and degradation model. In the description below, the organic matter production, transport and degradation model is simply referred to as organic model.

Notations

The following notations are used in the description:

OCC is the organic carbon content.

HI is the hydrogen index.

OI is the oxygen index.

k is the sediment class number (here, the term sediment encompasses the organic matter).

N is the number of sediment classes (here, the term sediment encompasses the organic matter).

Ox is oxygenation factor ranging between 0 and 1 with:

$Ox_{topo}$ being topographic oxygenation factor, and $Ox_{conso}$ being oxygen consumption factor.

A is the surface area of the lake or of the marine domain being studied.

$H_{max}$ is the maximum depth of the lake or of the marine domain studied.

PP is the production rate with:

$PP_k$ is the production rate (flux) of the sediment of class k.

$PP_{min}$ is the total primary production threshold.

$PP_0$ is the primary production rate for sediment of class k.

$Q_{nutriment}$ is the nutrient supply (flux).

$Q_{eau}$ is the water flux.

z is the sea or lacustrine bottom depth.

$z_0$ is the photic zone depth.

$n_k$ is the constant specific to organic sediment class k, with this constant being of the order of 0.6 to 1.6.

$Z_O$ is the oxidation zone maximum depth.

$Z_{Ox}$ is the oxidation zone local depth, corresponding to the oxygen penetration distance, and depending on local oxygenation factor Ox.

$Z_{Red}$ is the reduction zone depth.

$BE_k$ is the class k sediment burial efficiency, it is the amount of organic matter preserved in the sediments, with:

$BE_{Ox,k}$ is the oxidation zone burial efficiency.

$BE_{Red,k}$ is the reduction zone burial efficiency.

$v_s$ is the sedimentation rate.

a, b, c, i and n are calibration parameters that can be specific to sediment class k, these constants are determined from databases or from experimental measurements.

The method according to the invention allows construction of a numerical model quantifying the proportion of organic matter (notably characterized by the organic carbon content OCC) and the origin thereof (notably characterized by its hydrogen index HI and its oxygen index OI, as well as its mineralogy), within the layers of a sedimentary basin.

This goal is achieved by carrying out the following stages:
1) Basin deformation
2) Definition of sediment supply
3) Sediment transport taking accounting for the organic matter
4) Mass conservation
5) Quantification of a hydrocarbon potential
6) Development of the sedimentary basin.

Figure 2:
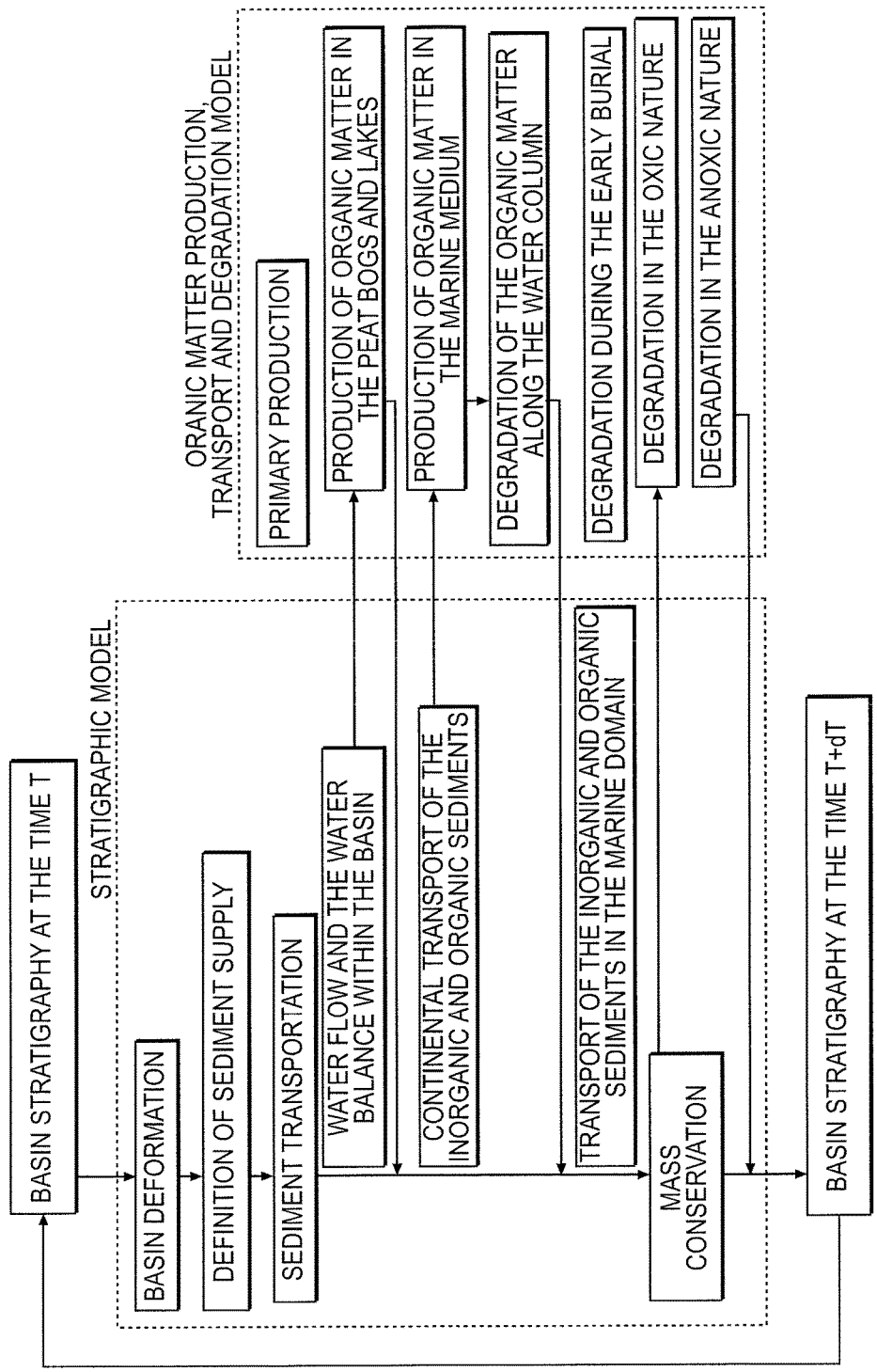
FIG. 2 illustrates the iterative stages of a stratigraphic simulation coupled with an organic matter production, transport and degradation model according to an embodiment of the invention.

FIG. 2 shows an embodiment of the iterative stratigraphic simulation method according to the invention. The interactions between the stratigraphic model and the organic matter production, transport and degradation model are described with the detailed description of stages 3) and 4). A more detailed description of the conventional stages, notably for the equations of the stratigraphic model, can be found notably in French Patent Application 2,849,211 corresponding to U.S. Pat. No. 7,043,367.

1) Basin Deformation

The space available for sedimentary filling of the basin is the sum of eustatism and subsidence. It can be chosen to define it point by point, either from eustatic curves and subsidence maps, or directly from accommodation maps, thus without using physical models relating eustatism to climate, or subsidence to tectonic, isostatic or thermal processes.

Although it does not modify the available space, compaction influences the sedimentary filling by modifying the thickness of the sedimentary layers. To account for mechanical compaction, a choice may be made to directly relate the sediment porosity to the maximum burial reached by the sediments, by use of an exponential relation allowing obtaining a good approximation of compaction as defined by: Parasnis, D. S., 1960, The Compaction of Sediments and Its Bearing on Some Geophysical Problems. Journal of the Royal Astronomical Society, V. 3, No. 1, pp. 1-28.

In order to account for the case of rocks made up of several sediment types, of mineral or organic origin, one may consider that each sediment has a porosity independent of the others, which amounts to likening sedimentary layers made up of a mixture of several sediments such as sand and clay to a superposition of multiple sublayers made up of pure sediments. The porosity linked with each sediment is thus treated individually according to the maximum burial reached by the sedimentary layer.

This definition of a sediment-related porosity allows in particular simulation of the individual transport of each sediment and to deduce therefrom the consequences on the porosity of the sedimentary layers.

2) Definition of Sediment Supply

The available space being created, the second stage of forming the desired model introduces sediments in the basin or produces them within the marine domain. The sedimentary rocks are described by use of a finite number of sediment classes, such as sand, clays, corals or algae. Each grid cell of the numerical model of the sedimentary basin is provided with information in a form of sediment class percentage. For example, a cell can contain 10% sand and 90% clay, or 40% corals, 30% algae and 30% clay. One goal of stratigraphic modelling is to predict the geometry and the sediment content (or mineralogy) of the sedimentary layers.

According to the invention, organic sediment classes are added to the inorganic sediment classes commonly used in stratigraphic models. These sediment classes correspond for example to organic matter of type I (organic matter of bacterial and algal origin formed in a marine or lacustrine medium), II or IIs (organic matter derived from phytoplankton, zooplankton and other marine organisms formed in a marine medium) or III (organic matter derived from higher plants produced in a continental medium). They can also correspond to biogenous silica. Each organic sediment class is characterized by three parameters which are its organic carbon content (OCC), its hydrogen and oxygen indices (HI and OI) and its mineralogy.

Thus, the stratigraphic model according to the invention defines N sediment classes including the organic sediments.

a) Introducing Sediments in the Domain Studied

The sediment fluxes at the boundaries of the domain being studied geologically represent the sediment supply responsible for the filling of the basin. They can be perceived physically in terms of boundary conditions of the sediment flux flowing through the basin.

These boundary conditions are set either by imposing the exact flux value in an area of the boundary, or by imposing a continuous evolution on the sediment flux. The first case represents a supply zone imposed by conditions external to the basin, such as the outlet of a river draining a river basin external to the basin. The second case represents a vacant area along which the sediment flux is governed by physical parameters internal to the basin, such as the wave characteristics. During basin simulation, it is possible to combine these two boundary condition types by distinguishing for example a continental area where the flux is imposed by the external fluvial supply and a marine area where the flux is defined by the internal transport laws.

b) The Sediment Production within the Domain Studied

Sediments can also be produced within the basin, more particularly in the case of carbonate or organic sediments. For this construction stage of the model according to the invention, it is chosen to simulate this production by use of an empirical formula relating the production rate at each point of the basin to the bathymetry and to the sediment fluxes as defined for example by: Lawrence et al., 1990, Stratigraphic Simulation of Sedimentary Basins: concepts and calibration in *Amer. Assoc. Petrol. Geol. Bull.*, 74, 3, 273-295.

In order to account for the erosion of reefs when they are emerged, the process of mechanical alteration of these reefs can be simulated by considering that any reef sediment located in the alteration layer in the continental domain is converted to a "bioclastic" sediment. The reef and bioclastic sediments are transported in the basin like the siliciclastic sediments.

3) Sediment Transport Taking Account of the Organic Matter

The goal of coupling stratigraphic and organic modelling is to predict the hydrocarbon potential of the basin, in particular by determining the OCC, the local HI and OI values, and the mineralogy, according to the production, transport and degradation of the organic classes.

In order to determine the transport of sediments according to an embodiment of the invention, various stages are carried out so as to determine consecutively:

the water flow and the water balance within the basin (stratigraphic model), the production of organic matter in the peat bogs and lakes (organic model), the continental transport of the inorganic and organic sediments (stratigraphic model), the production of organic matter in the marine medium (organic model), the degradation of the organic matter along the water column (organic model), and the transport of the inorganic and organic sediments in the marine domain (stratigraphic model).

i) Water Flow and Water Balance

This first stage determines the water flow and the water balance at the time T for which the stratigraphic simulation is carried out. The water flow concerns the water stream flowing at the ground surface at the time T. Meteorological phenomena such as rain and water evaporation can be taken into account for the water balance.

Figure 3:
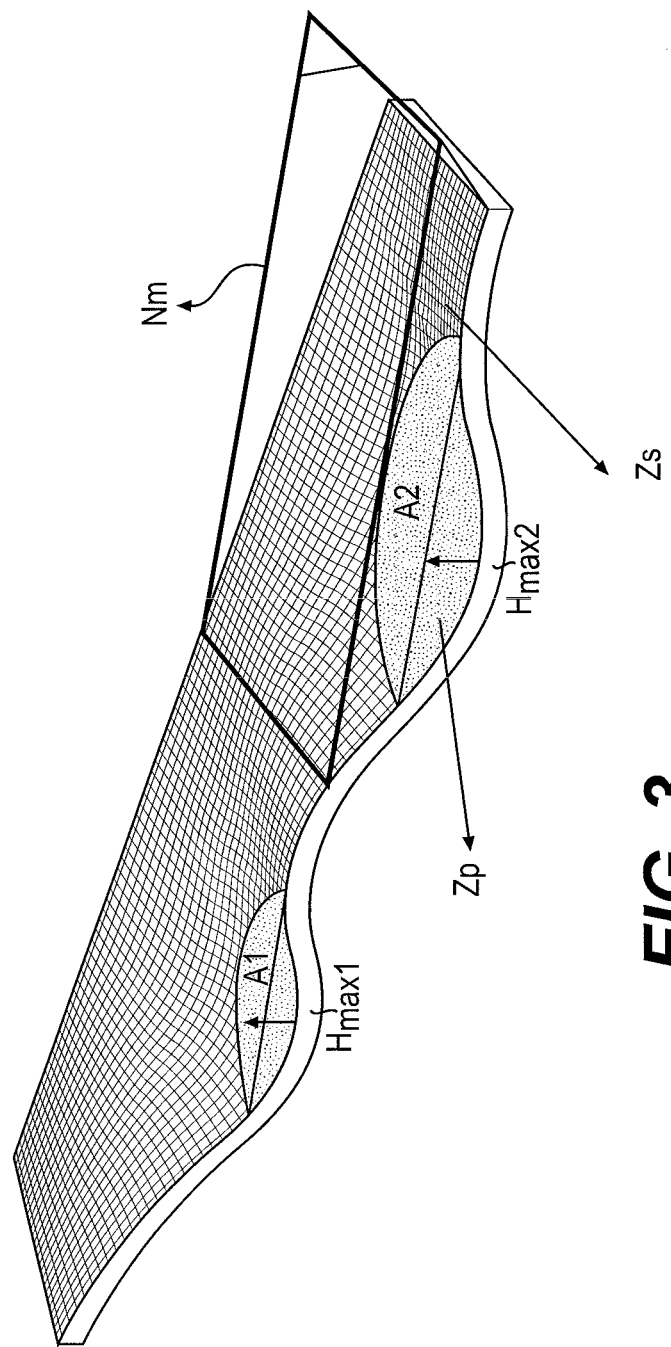
FIG. 3 shows the division of the lakes and marine domains.

An oxygenation rate of the water can also be determined in this stage. Each lake and marine domain is divided into two water layers delimited by its topographic threshold: a surface zone (Zs) and a deep zone (Zp) (see FIG. 3). In this FIG. 3, Nm designates the sea level. In the case of lakes, surface zone (Zs) has zero thickness. Conversely, in the open marine domain without topographic threshold, deep zone (Zp) has zero thickness. The surface zone is assumed to be always oxygenated, whereas the oxygenation percentage of the deep zone depends on its morphology. In the method according to the invention, the real oxygenation of the water is not calculated because this type of calculation is too computation time consuming considering the objective of the invention (study the evolution of sedimentary basins over times of the order of a million years). Advantageously, an oxygenation factor ranging between 0 and 1, denoted by Ox, can be used. This oxygenation factor is calculated from the basin physiography and the local primary production.

A topographic oxygenation factor $Ox_{topo}$ is calculated from the physiography of the lakes and of the marine domain (see FIG. 3) using a formula of the type as follows:

$$Ox_{topo} = a_3 \left( \frac{A^{\frac{1}{2}}}{H_{max}} \right)^{b_3}.$$

Moreover, an oxygen consumption factor can also be determined. In a case of too high an organic matter production, the oxygen can be totally consumed by the degradation processes. It is considered that, above a total primary production threshold $PP_{min}$, the oxygenation factor decreases with the production. The oxygen consumption factor $Ox_{conso}$ can be calculated using a formula of the type as follows: $Ox_{conso}=1$ if $PP<PP_{min}$ otherwise $$Ox_{conso} = \left( \frac{PP_{min}}{PP} \right)^{b4}.$$

The determination of total oxygenation factor Ox is then defined as a function of the topographic oxygenation factor and of the oxygen consumption factor by a relation of the type as follows: $Ox=Ox_{topo} \cdot Ox_{conso}$.

ii) Organic Matter Production in Peat Bogs and Lakes

This stage allows quantifying the production rate of organic sediments (or primary productivity) in two sedimentary environments, the lacustrine domains and peat bogs, by use of the organic model as a function of the water flow and of the water balance. In the emerged continental domain (apart from lakes), the primary production rate is linked with the levels of the groundwater and their fluctuation. In the method according to the invention, the groundwater level is assumed to be proportional to the water flux flowing at the surface of the ground. This primary production adds to the sediment supply previously defined in the stratigraphic model.

The primary production of organic matter of class k in peat bogs is defined by use of a power law: $PP_{0,k}=a_{2,k}Q_{eau}^{b2,k}$ with $Q_{eau}$ the water flux, and $a_{2,k}$ and $b_{2,k}$ constants specific to sediment class k.

The production rate of sediments of class k is then determined by use of a formula determined by Martin's law (1987) of the type as follows:

$$PP_k(z) = PP_{0,k} \left( \frac{z}{z_0} \right)^{-nk}$$

if $z>z_0$, otherwise $PP_k(z)=PP_{0,k}$ with $PP_k$ the class k sediment flux reaching the bottom of the peat bog, z the depth of the peat bog, $z_0$ the depth of the photic zone of the aquatic medium, $n_k$ a constant specific to the organic sediment of class k whose value is generally of the order of 0.6 to 1.6.

Martin's law is notably described in the following document: Martin, J. H., G. A. Knauer, D. M. Karl, W. W. Broenkow, (1987). VERTEX: Carbon Cycling in the Northeast Pacific. Deep-Sea Res. 34: 267-285.

iii) Continental Transport of Sediments

The transport of sediments is then calculated only in the continental domain first, in order to estimate the flux of sediments, in particular nutrients, reaching the coastline. The stratigraphic model then calculates the production and the transport of nutrients in the sedimentary basin, like a carbonate or bacterial production (production rate depending on the water depth, the hydrodynamism, the distance to the coast, the temperature and the salinity of the water, etc.). This continental transport of the sediments can account for phenomena such as erosion and sedimentation in the continental domain.

A first calculation of the sediment transport in the marine domain can then be carried out, only for the fine particles, in order to determine the evolution of the sediment plume suspended in the sea water, and in particular the nutrient distribution in the marine domain.

iv) Organic Matter Production in the Marine Medium

The nutrient distribution and the basin physiography are supplied to the organic model so that it calculates for the marine domain the primary production of marine organic sediments, then the degradation of these marine organic sediments when falling along the water column.

This stage allows quantifying the organic sediment production rate (or primary productivity) in a sedimentary environment, the marine domain. The method according to the invention then defines the primary production rate of organic sediment in an aquatic domain, marine or lacustrine, as a function of the nutrient supply, by use of a power law. For each organic sediment class k: $PP_{0,k}=a_{1,k}Q_{nutriment}^{b1,k}$ with $Q_{nutriment}$ being the nutrient supply determined in the previous stage, and $a_{1,k}$ and $b_{1,k}$ being constants specific to sediment class k.

The nature of the organic matter can differ depending on the production contexts (climate, ocean circulation). The consequences are biogenic sediment supplies that may differ.

Any organic matter produced in an aquatic medium (marine or lacustrine) is assumed to be produced at the top of surface zone (Zs). The method according to the invention describes its degradation as it falls along the water column by taking account of the existence of two water layers: oxic surface layer (Zs) and partly oxic deep layer (Zp) (see FIG. 3).

The production rate of the class k sediment is then determined using a formula determined by Martin's law (1987) of the type as follows:

$$PP_k(z) = PP_{0,k} \left(\frac{z}{z_0}\right)^{-n_k}$$

if $z > z_0$, if $PP_k(z) = PP_{0,k}$ with $PP_k$ being the class k sediment flux reaching the sea bottom, z being the depth of the marine domain, $z_0$ being the depth of the photic zone of the aquatic medium, and $n_k$ being a constant specific to the organic sediment of class k whose value is generally of the order of 0.6 to 1.6.

v) Organic Matter Degradation Along the Water Column

According to the invention, the stratigraphic simulation accounts for the degradation of the organic matter along the water column, that is the degradation of the organic matter during its production in the marine domain. The organic model determines this degradation of the organic matter produced within this water column in order to determine an organic sediment flux reaching the sea bottom.

vi) Sediments and Organic Matter Transport

The marine organic sediment flux reaching the sea bottom is supplied in return to the stratigraphic model. The stratigraphic model conventionally calculates the transport of the sediments in the marine domain, whether organic or inorganic. During this stage, the only difference with the stratigraphic models used in the prior art is the taking into account of a larger number of sediment classes (including organic sediment classes).

The modelled transport concerns for example long-term, short-term or catastrophic sediment transport.

Long-term processes correspond to the permanent transport of sediments induced by rivers, ocean currents, or the slow action of gravity (creep, etc.). Within the context of the method according to the invention, it is considered that these processes can be modelled by a diffusion equation constrained by the water flux and by a reduced availability.

Short-term processes correspond to the transport of sediments during episodic but intense phenomena such as heavy rain inducing fluvial floods and hyperpycnal currents in the marine domain. Within the scope of this invention, it is considered that these processes can be modelled by an enhanced diffusion equation constrained by the water flux, by a reduced availability and by the water flow rate.

Such an episodic sediment transport has been studied for a long time for fluvial, coastal and marine engineering problems. The goal of these studies is generally to determine the transport capacity of a water current, in order to know whether human installations such as houses, bridges, ports or offshore platforms can withstand such a current. It is generally admitted that a watercourse can be characterized by three main quantities: its velocity u, its depth h and its width w. It is furthermore generally admitted that the Saint-Venant equations corresponding to the formulation for a fluid of Newton's equation (sum of the forces=acceleration) allow determination of these characteristics at any point of a flow.

Catastrophic processes correspond to the mass transport of sediments after cliff or slope collapses. Unstable zones are first determined by applying a critical slope criterion. This critical slope varies locally and depends on the lithologic nature of the sediments in the ground.

Any unstable zone is then subjected to mass displacement by applying Newton's equation with the acceleration of the collapse being equal to the sum of the forces applied onto the collapse (gravity and friction). This equation allows each collapse to be moved through the basin. One may consider that the collapse freezes as soon as its velocity decreases below a critical threshold.

The implementation of the model according to the invention comprises the numerical solution of the transport equations based on a spatial discretization of the basin studied and a time discretization of the formation.

The basin being studied can be broken up into square grid cells of constant size, while filling of this grid is simulated through a succession of computing times separated by a constant time interval. The width of the cells is for example of the order of 1 to 10 kilometers depending on the simulated basin, and the time interval is of the order of 50,000 years.

The transport equations are then solved using an explicit numerical scheme where the physical parameters such as the flux or the altitude at the time (n+1) are expressed as a function of parameters measured at the time (n) and whose values are thus known.

The simulation leads to quantitative data on the geometry of the basin and on the lithologies of the sedimentary units.

A detailed description of the transport calculation can be found notably in French Patent Application 2,849,211 and corresponding U.S. Pat. No. 7,043,367.

4) Mass Conservation

The principle of mass conservation is used to calculate the sedimentation or erosion rate at each point of the basin from the determination of the sediments transported. This sedimentation rate and the local proportion of continental and marine organic matter are supplied to the organic model so that it calculates the rate of preservation of the organic matter during the early burial thereof, as a function of the sedimentation rate and of the oxic or anoxic nature of the sea bottom.

Indeed, after their transport, organic sediments undergo degradation due to oxidizing and reducing agents. This degradation is active in the surface layer of sediments whose depth ranges from some centimeters to some meters. This surface layer is divided into two zones which are an oxido-reduction zone and a reduction zone. For the sake of consistency with the laws described in this paragraph, the degradation zones are preferably defined as the oxidation zone, contained between the water-sediment surface and the depth of penetration of the oxidizing agents (some centimeters), and the reduction zone contained between the surface and the depth of penetration of the reducing agents (some meters). This definition implies that part of the reduction zone and the oxidation zone merge spatially.

The depth of oxidation zone $Z_{Ox}$ is related to the distance of penetration of the oxygen, characterized by oxygenation factor Ox described above: $Z_{Ox} = Z_0 \cdot Ox$. Conversely, the reduction zone is independent of the oxygenation fraction and it is assumed to be always non zero ($Z_{Red} > 0$).

The rate of degradation of the organic matter during the burial phase is conditioned by the residence time of the organic matter in each degradation zone. The degradation law according to the invention takes this effect into account by assuming that the degradation rate is a function of the sedimentation rate: $BE_{Ox,k} = (a_{Ox,k} + b_{Ox,k} \cdot Z_{Ox} \cdot v_s)^{n_{Ox,k}}$ and $BE_{Red,k} = (a_{Red,k} + b_{Red,k} \cdot v_s)^{n_{Red,k}}$.

The total burial efficiency is then deduced according to a formula of the type as follows: $BE_k = BE_{Ox,k} \cdot BE_{Red,k}$.

5) Quantification of a Hydrocarbon Potential

The hydrocarbon potential of the sedimentary basin can be determined from the stratigraphic simulation coupled with the organic model. Indeed, the hydrocarbons are derived from the organic matter present in the basin. This potential can correspond to the hydrocarbon distribution in the basin, to the organic matter richness and to the origin thereof.

For this quantification, it is possible to determine the OCC (organic carbon content), the hydrogen and oxygen indices HI and OI, and the mineralogy of the organic matter within the layers of the sedimentary basin.

For example, the final hydrogen index in the preserved organic matters is calculated as a function of the proportions of each type of organic matter that is present. Furthermore, since the burial efficiency and nature (oxic or anoxic conditions) controls the value of this index, the final hydrogen index is calculated with a law specific to the invention, of the form as follows:

$$IH = \sum_{k=1}^{N} c_k \cdot IH_k \cdot BE_{Ox,k}^{i1,k} \cdot BE_{Red,k}^{i2,k}.$$

6) Development of the Sedimentary Basin

Petroleum exploration searches for hydrocarbon reservoirs in a sedimentary basin. Using the hydrocarbon potential quantification according to the invention, the distribution of the hydrocarbons, their quality and their origins within a sedimentary basin can be predicted.

Basin development can be carried out in different manners, notably by means of:

exploratory drilling in the various zones with the best potential, in order to confirm or to invalidate the previously estimated potential, and to acquire new data fuelling new and more precise studies, exploitation drilling (production or injection wells) for recovery of the hydrocarbons present in the sedimentary basin in the zones with the best potential.

For all the laws presented in this application, calibration of the parameters of these laws (a, b, c, i, n) can be based on different databases specific to the depositional environment (marine or lacustrine, media that are differentiated by geochemical parameters such as salinity) and to the organic matter type (marine or terrestrial). For example, concerning the organic matter of marine origin, the calibration parameters for these laws are deduced from the data synthesized by Betts and Holland (1991) in the document: Betts, J. N. and Holland, H. D. (1991). The oxygen content of ocean bottom waters, the burial efficiency of organic carbon, and the regulation of atmospheric oxygen Palaeogeography, Palaeoclimatology, Palaeoecology (Global and Planetary Change Section), 97 (1991) 5-18. On the other hand, concerning the organic matter of terrestrial origin, the calibration parameters for these laws are deduced from the data synthesized by Aller (1998) in the document: Aller, R. C. (1998). Mobile Deltaic and Continental Shelf Muds as Suboxic, Fluidized Bed Reactors, Mar. Chem., 61, 143-155.

Alternatively, in order to obtain more precise information, calibration of these parameters can be obtained experimentally, for example from measurements in the sedimentary basin.

Application Example

The method according to the invention was tested and validated on synthetic and real cases, as in the Appalachian Basin, in Pennsylvania (USA). At the end of the Paleozoic era, towards 400 to 300 million years (Ma) B.C., the Appalachian mountain range formed and induced the formation of a sedimentary basin called Appalachian Basin. During the Devonian (390-360 Ma), this basin corresponded to an arm of the Tethys Ocean that was going to progressively close and be filled with the erosion products of the Appalachian range. As a result of this progressive closing of the ocean connection, the marine medium became poor in oxygen, or even anoxic, and the marine organic matter could thus be preserved. This organic matter gave birth to the gas-rich clays of the Marcellus formation (or Marcellus shale) currently exploited in the USA.

In order to test the method according to the invention, a coupled stratigraphic-organic model was achieved for a 800 km×600 km basin discretized with 5 km×5 km cells. This model represents the evolution of the basin from 390 to 360 Ma, with a time interval of 1 Ma. Four sediment classes (or mineralogy) are modelled: the sands (or Quartz and Feldspaths, undifferentiated), the clays (or Phyllosilicates), the carbonates (or Calcite) and the organic sediments.

The deformation of the basin is defined by means of three parameters:

a tectonic and flexural deformation induced by the growth of the Appalachian range, an internal flexural deformation due to the weight of the sediments, and a sea level variation. The tectonic deformation was measured from the published maps of current sediment thickness in Pennsylvania; the internal flexural deformation was modelled using a 3D elastic model, and the sea level variation is defined by means of the Haq curves.

The current thickness maps allowed estimation of the sediment supply, of the order of 12,800 km$^3$/Ma, and entering from the South-Eastern side of the basin, as well as the rate of production of the carbonates and of the marine organic matter, of the order of 10 and 1 m/Ma respectively.

Figure 4A:
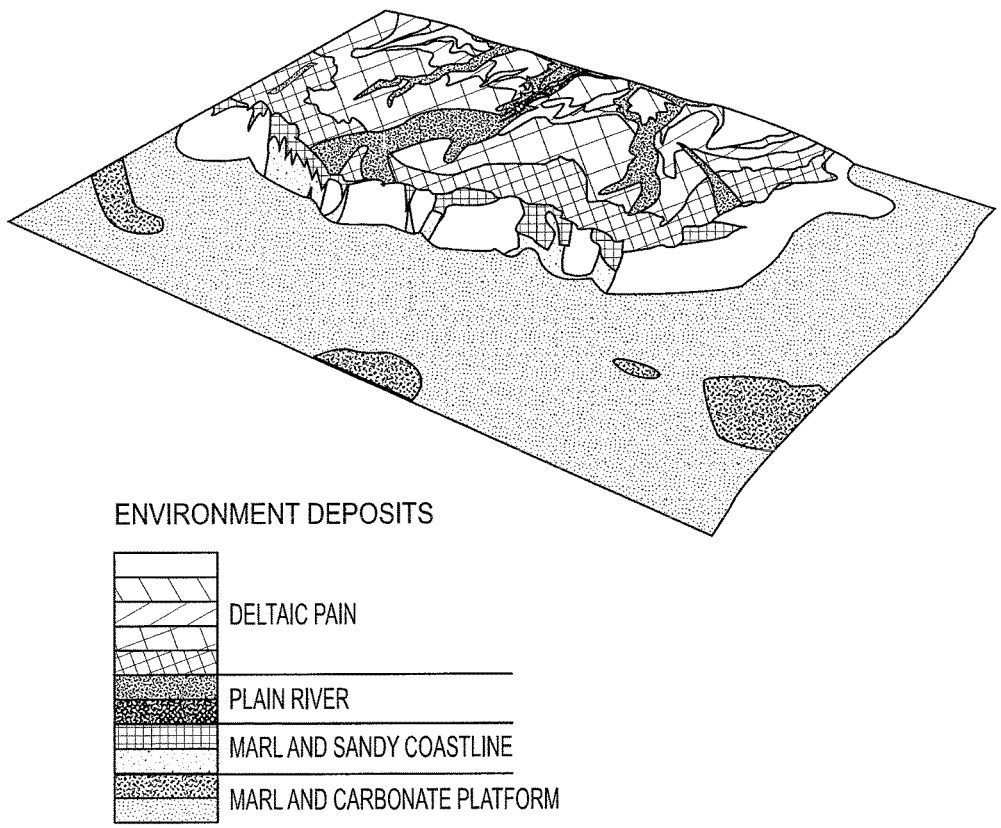
FIGS. 4A and 4B respectfully illustrate Paleo-Geography Simulations at 380 million and 360 million years and show simulation results for an application example.
Figure 4B:
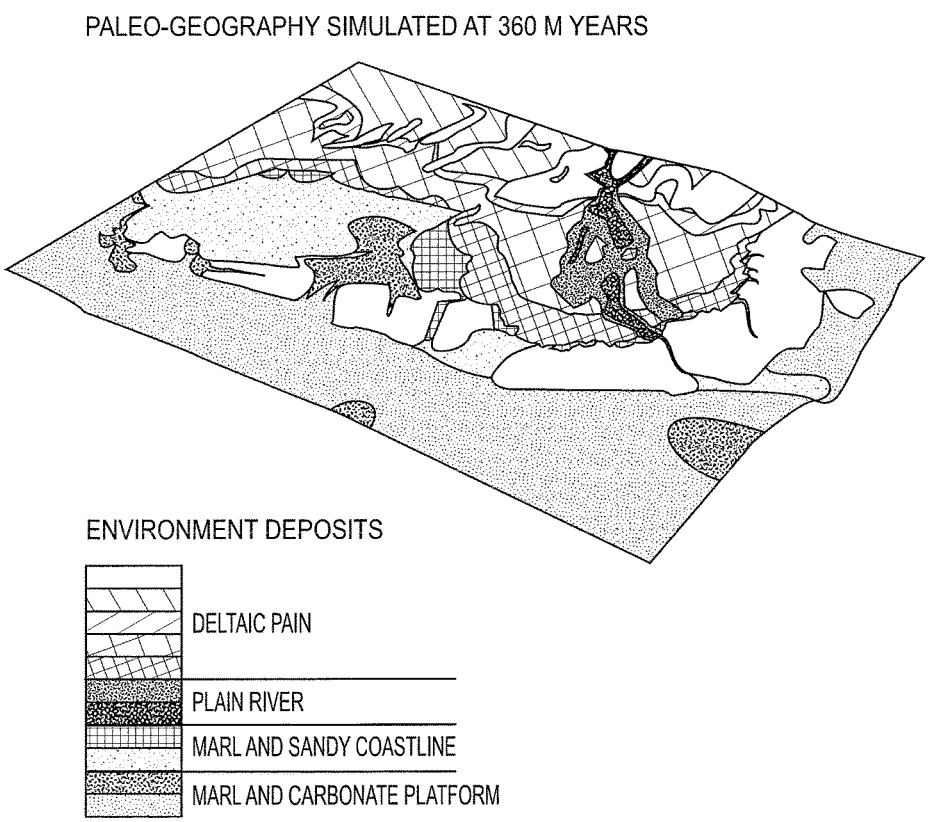
Figure 5:
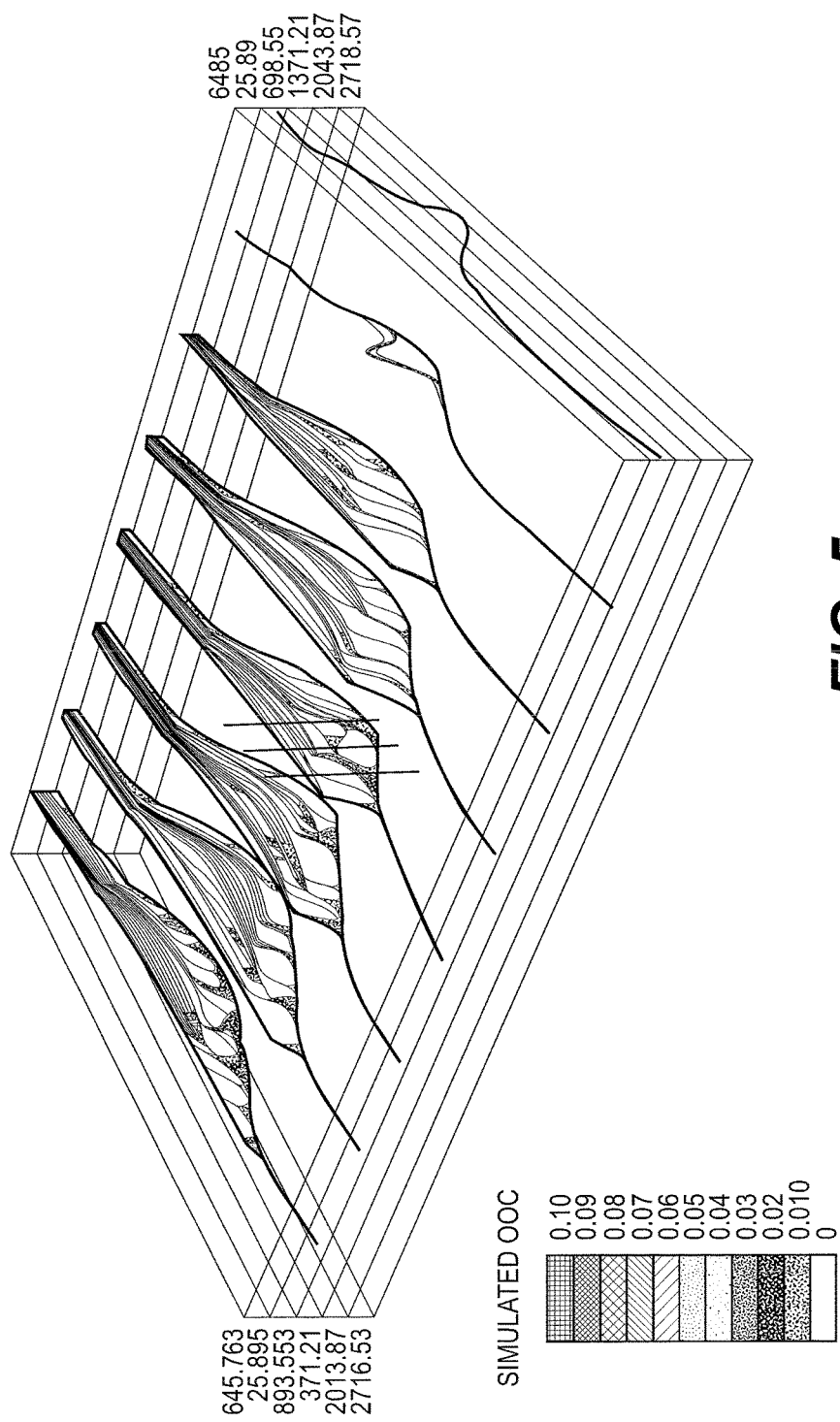
FIG. 5 shows quantifying geometry of each sedimentary layer and mineral content.
Figure 6:
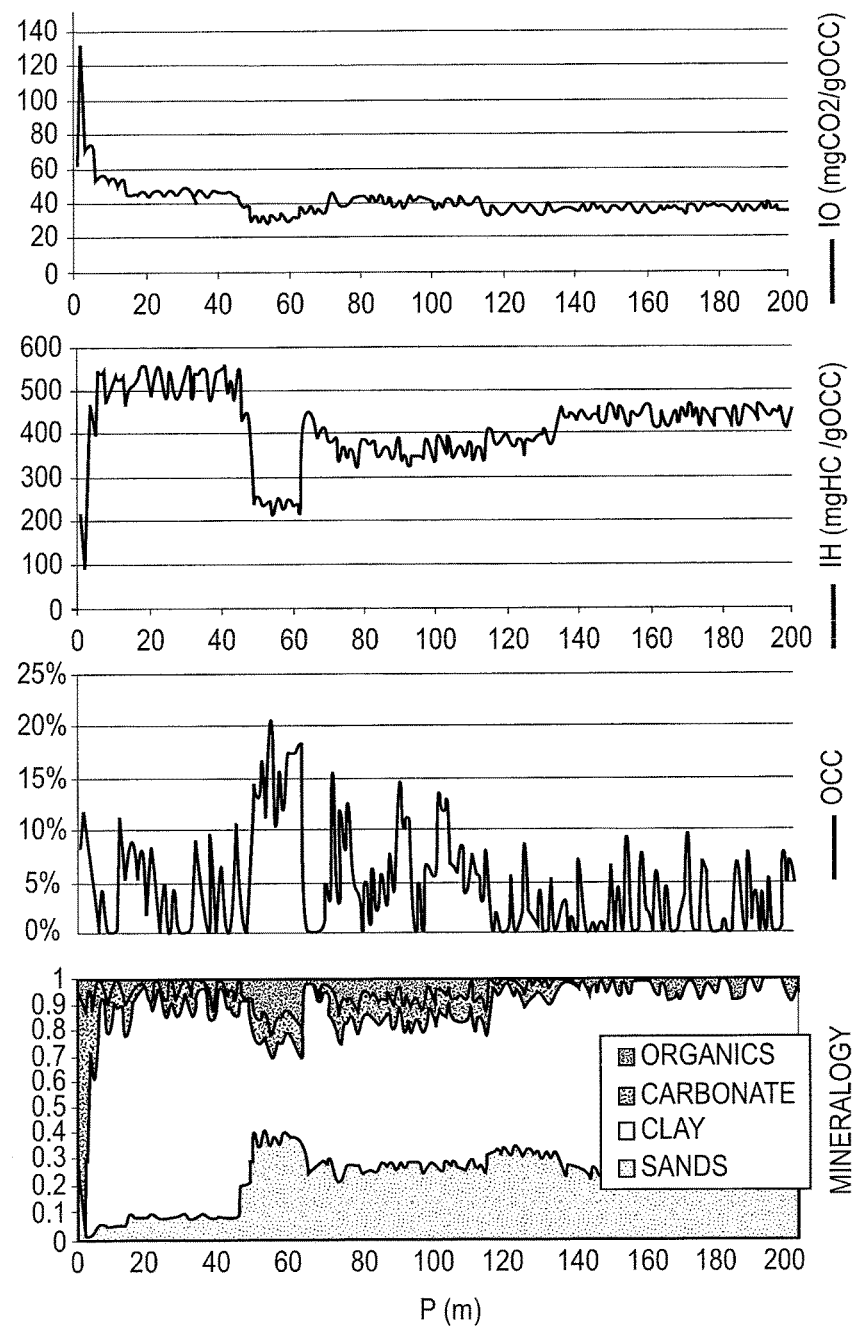
FIG. 6 shows organic sediments as a function of depth in meters.

The coupled stratigraphic-organic model according to the invention allows reproduction of the evolution of the Appalachian Basin (see FIGS. 4 A and B) with, in particular, the growth of the Catskill delta that progressively fills in the basin. In addition to simulating the evolution of the basin geography, the coupled stratigraphic-organic model according to the invention allows quantifying the geometry of each sedimentary layer (see FIG. 5), as well as the mineralogical content, in particular the organic carbon content (OCC), and the hydrogen and oxygen indices HI and OI of the organic sediments as a function of depth P in m (see FIG. 6).

The invention claimed is:

1. A method of developing a sedimentary basin using qualification of hydrocarbon potential of the sedimentary basin, comprising:

breaking up the sedimentary basin into geologic layers with each geologic layer corresponding to a sediment deposition for a given time period;

determining a composition of the geologic layers through coupling of a stratigraphic simulation with an organic matter production and degradation model by using an iterative stratigraphic simulation, from a past to a more recent time, within each geologic layer, by use of a stratigraphic model and the organic matter production and degradation model, by determining production of the organic matter within the geologic layer using the organic matter production and degradation model;

modelling transport of sediments and the organic matter production using the stratigraphic model, determining degradation of the organic matter during the transport using the organic matter production and degradation model, determining stratigraphy of the basin by accounting for mass conservation by use of the transport of sediments and the degradation of organic matter, and determining organic matter degradation within the stratigraphy using the organic matter production and degradation model;

quantifying hydrocarbon potential of the geologic layers of the sedimentary basin from the composition; and developing the sedimentary basin according to the quantification of the hydrocarbon potential to extract hydrocarbons from the sedimentary basin including at least one of performing exploratory drilling and performing exploitation drilling in a least one zone having a best potential for producing hydrocarbons in the sedimentary basin.

2. A method as claimed in claim 1 wherein, for the stratigraphic simulation, the sediments and the organic matter are described by using a finite number of sediment and organic matter classes.

3. A method as claimed in claim 2, wherein the hydrocarbon potential is quantified by determining at least one of an organic carbon content (OCC), hydrogen indices (HI), oxygen indices (OI), and mineralogy of sediments within each geologic layer.

4. A method as claimed in claim 3, wherein production of organic matter is determined by accounting for a nutrient distribution estimation by the stratigraphic model.

5. A method as claimed in claim 4, wherein organic matter production in at least one marine or lacustrine domain is determined from an equation as follows:

$$PP_k(z) = PP_{0,k} \left(\frac{z}{z_0}\right)^{-nk}$$

if $z>z_0$, otherwise $PP_k(z)=PP_{0,k}$ with $PP_k$ being sediment flux of class k reaching a sea bottom, z being depth of the sea or lacustrine bottom, $z_0$ being a depth of the photic zone of an aquatic medium, $n_k$ being a constant specific to organic sediment class k and $PP_{0,k}$ being the primary production rate defined by $PP_{0,k}=a_{1,k}Q_{nutriment}^{b1,k}$ with $Q_{nutriment}$ being a nutrient supply, and $a_{1,k}$ and $b_{1,k}$ being constants specific to sediment class k.

6. A method as claimed in claim 5, wherein organic matter production in peat bogs is determined from an equation as follows:

$$PP_k(z) = PP_{0,k} \left(\frac{z}{z_0}\right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

7. A method as claimed in claim 4, wherein organic matter production in peat bogs is determined from an equation as follows:

$$PP_k(z) = PP_{0,k} \left(\frac{z}{z_0}\right)^{-nk}$$

if $z>z_0$, otherwise $PP_k(z)=PP_{0,k}$ with being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

8. A method as claimed in claim 3, wherein organic matter production in peat bogs is determined from an equation as follows:

$$PP_k(z) = PP_{0,k} \left(\frac{z}{z_0}\right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

9. A method as claimed in claim 2, wherein organic matter production in peat bogs is determined from an equation as follows:

$$PP_k(z) = PP_{0,k} \left(\frac{z}{z_0}\right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

10. A method as claimed in claim 2, wherein degradation of the organic matter is determined from organic matter burial efficiency by steps comprising:
 (1) determining a water oxygenation factor;
 (2) determining an organic matter burial efficiency in oxidation zones and an organic matter burial efficiency in reduction zones by use of the water oxygenation factor; and
 (3) determining the organic matter burial efficiency by using the organic matter burial efficiency in the oxidation and the reduction zones.

11. A method as claimed in claim 1, wherein the hydrocarbon potential is quantified by determining at least one of an organic carbon content (OCC), hydrogen indices (HI), oxygen indices (OI), and mineralogy of sediments within each geologic layer.

12. A method as claimed in claim 11, wherein production of organic matter is determined by accounting for a nutrient distribution estimation by the stratigraphic model.

13. A method as claimed in claim 12, wherein organic matter production in at least one marine or lacustrine domain is determined from an equation as follows:

$$PP_k(z) = PP_{0,k} \left(\frac{z}{z_0}\right)^{-nk}$$

if $z>z_0$, otherwise $PP_k(z)=PP_{0,k}$ with $PP_k$ being sediment flux of class k reaching a sea bottom, z being depth of the sea or lacustrine bottom, $z_0$ being a depth of the photic zone of an aquatic medium, $n_k$ being a constant specific to organic sediment class k and $PP_{0,k}$ being the primary production rate defined by $PP_{0,k}=a_{1,k}Q_{nutriment}^{b1,k}$ with $Q_{nutriment}$ being a nutrient supply, and $a_{1,k}$ and $b_{1,k}$ being constants specific to sediment class k.

14. A method as claimed in claim 13, wherein organic matter production in peat bogs is determined from an equation as follows:

$$PP_k(z) = PP_{0,k}\left(\frac{z}{z_0}\right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

15. A method as claimed in claim 12, wherein organic matter production in peat bogs is determined from an equation as follows:

$$PP_k(z) = PP_{0,k}\left(\frac{z}{z_0}\right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

16. A method as claimed in claim 11, wherein organic matter production in peat bogs is determined from an equation as follows:

$$PP_k(z) = PP_{0,k}\left(\frac{z}{z_0}\right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

17. A method as claimed in claim 11, wherein degradation of the organic matter is determined from organic matter burial efficiency by steps comprising:
   (1) determining a water oxygenation factor;
   (2) determining an organic matter burial efficiency in oxidation zones and an organic matter burial efficiency in reduction zones by use of the water oxygenation factor; and
   (3) determining the organic matter burial efficiency by using the organic matter burial efficiency in the oxidation and the reduction zones.

18. A method as claimed in claim 11, wherein the hydrogen indices are determined using a formula as follows:

$$IH = \sum_{k=1}^{N} c_k \cdot IH_k \cdot BE_{Ox,k}^{i1,k} \cdot BE_{Red,k}^{i2,k}$$

with IH being a final hydrogen index, N being a number of sediment and organic matter classes, $c_k$ being a mass fraction of organic matter k, $IH_k$ being an initial hydrogen index of sediment class k, $BE_{Ox,k}^{i1,k}$ and $BE_{Red,k}^{i2,k}$ being the burial efficiency for organic matter k, and i1 and i2 being constants specific to each sediment class k.

19. A method as claimed in claim 1, wherein production of organic matter is determined by accounting for a nutrient distribution estimation by the stratigraphic model.

20. A method as claimed in claim 19, wherein organic matter production in at least one marine or lacustrine domain is determined from an equation as follows:

$$PP_k(z) = PP_{0,k}\left(\frac{z}{z_0}\right)^{-nk}$$

if $z>z_0$, otherwise $PP_k(z)=PP_{0,k}$ with $PP_k$ being sediment flux of class k reaching a sea bottom, z being depth of the sea or lacustrine bottom, $z_0$ being a depth of the photic zone of an aquatic medium, $n_k$ being a constant specific to organic sediment class k and $PP_{0,k}$ being the primary production rate defined by $PP_{0,k}=a_{1,k}Q_{nutriment}^{b1,k}$ with $Q_{nutriment}$ being a nutrient supply, and $a_{1,k}$ and $b_{1,k}$ being constants specific to sediment class k.

21. A method as claimed in claim 20, wherein organic matter production in peat bogs is determined from an equation as follows:

$$PP_k(z) = PP_{0,k}\left(\frac{z}{z_0}\right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being with constants specific to sediment class k.

22. A method as claimed in claim 20, wherein degradation of the organic matter is determined from organic matter burial efficiency by steps comprising:
   (1) determining a water oxygenation factor;
   (2) determining an organic matter burial efficiency in oxidation zones and an organic matter burial efficiency in reduction zones by use of the water oxygenation factor; and
   (3) determining the organic matter burial efficiency by using the organic matter burial efficiency in the oxidation and the reduction zones.

23. A method as claimed in claim 20, wherein a water oxygenation factor Ox is determined using a formula: $Ox=Ox_{topo} \cdot Ox_{conso}$ with $Ox_{topo}$ being a topographic oxygenation factor and $Ox_{conso}$ being an oxygen consumption factor, with $Ox_{topo}$ being defined by a relation as follows:

$$Ox_{topo} = a_3 \left( \frac{A^{\frac{1}{2}}}{H_{max}} \right)^{b_3}$$

with A being a surface area of aquatic medium, $H_{max}$ being a maximum depth of the aquatic medium, $a_3$ and $b_3$ being specific constants, and $Ox_{conso}$ being defined by a relation as follows: $Ox_{conso}=1$ if $PP<PP_{min}$ otherwise $$Ox_{conso} = \left( \frac{PP_{min}}{PP} \right)^{b4}$$

with PP being a sum of the production rates $PP_k$ of each organic sediment class k, $PP_{min}$ being a total primary production threshold and $b_4$ being a constant.

24. A method as claimed in claim 23, wherein the organic matter burial efficiency $BE_{Ox,k}$ in the oxidation zones is determined using a formula as follows: $BE_{Ox,k}=(a_{Ox,k}+b_{Ox,k}\cdot Z_{Ox}\cdot v_s)^{n_{Ox,k}}$ with $v_s$ being the sedimentation rate, $a_{Ox,k}$, $b_{Ox,k}$ and $n_{Ox,k}$ being constants, $Z_{Ox}$ being an oxygen penetration distance defined by a formula as follows: $Z_{Ox}=Z_0 \cdot Ox$ with $Z_0$ being a maximum depth of the aquatic medium.

25. A method as claimed in claim 23, wherein the organic matter burial efficiency $BE_{Red,k}$ in reduction zones is determined using a formula as follows: $BE_{Red,k}=(a_{Red,k}+b_{Red,k}\cdot v_s)^{n_{Red,k}}$ with $v_s$ being the sedimentation rate, and $a_{Red,k}$, $b_{Red,k}$ and $n_{Red,k}$ being constants.

26. A method as claimed in claim 19, wherein organic matter production in peat bogs is determined from an equation as follows:

$$PP_k(z) = PP_{0,k} \left( \frac{z}{z_0} \right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

27. A method as claimed in claim 19, wherein degradation of the organic matter is determined from organic matter burial efficiency by steps comprising:
 (1) determining a water oxygenation factor;
 (2) determining an organic matter burial efficiency in oxidation zones and an organic matter burial efficiency in reduction zones by use of the water oxygenation factor; and
 (3) determining the organic matter burial efficiency by using the organic matter burial efficiency in the oxidation and the reduction zones.

28. A method as claimed in claim 1, wherein organic matter production in peat bogs is determined from an equation as follows:

$$PP_k(z) = PP_{0,k} \left( \frac{z}{z_0} \right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

29. A method as claimed in claim 28, wherein organic matter production in peat bogs is determined from an equation as follows:

$$PP_k(z) = PP_{0,k} \left( \frac{z}{z_0} \right)^{-nk}$$

if $z>z_0$, otherwise $PP_k(z)=PP_{0,k}$ with $PP_k$ being sediment flux of class k reaching the bottom of the peat bog, z being a depth of the peat bog, $z_0$ being a depth of the photic zone of the aquatic medium, $n_k$ being a constant specific to the organic sediment of class k and $PP_{0,k}$ being primary production rate defined by $PP_{0,k}=a_{2,k}Q_{eau}^{b2,k}$ with $Q_{eau}$ being the water flux, and $a_{2,k}$ and $b_{2,k}$ being constants specific to sediment class k.

30. A method as claimed in claim 28, wherein degradation of the organic matter is determined from organic matter burial efficiency by steps comprising:
 (1) determining a water oxygenation factor;
 (2) determining an organic matter burial efficiency in oxidation zones and an organic matter burial efficiency in reduction zones by use of the water oxygenation factor; and
 (3) determining the organic matter burial efficiency by using the organic matter burial efficiency in the oxidation and the reduction zones.

31. A method as claimed in claim 1, wherein degradation of the organic matter is determined from organic matter burial efficiency by steps comprising:
 (1) determining a water oxygenation factor;
 (2) determining an organic matter burial efficiency in oxidation zones and an organic matter burial efficiency in reduction zones by use of the water oxygenation factor; and
 (3) determining the organic matter burial efficiency by using the organic matter burial efficiency in the oxidation and the reduction zones.

32. A method as claimed in claim 31, wherein the organic matter burial efficiency $BE_{Ox,k}$ in the oxidation zones is determined using a formula as follows: $BE_{Ox,k}=(a_{Ox,k}+b_{Ox,k}\cdot Z_{Ox}\cdot v_s)^{n_{Ox,k}}$ with $v_s$ being the sedimentation rate, $a_{Ox,k}$, $b_{Ox,k}$ and $n_{Ox,k}$ being constants, $Z_{Ox}$ being an oxygen penetration distance defined by a formula as follows: $Z_{Ox}=Z_0 \cdot Ox$ with $Z_0$ being a maximum depth of the aquatic medium.

33. A method as claimed in claim 32, wherein the organic matter burial efficiency $BE_{Red,k}$ in reduction zones is determined using a formula as follows: $BE_{Red,k}=(a_{Red,k}+b_{Red,k}\cdot v_s)^{n_{Red,k}}$ with $v_s$ being the sedimentation rate, and $a_{Red,k}$, $b_{Red,k}$ and $n_{Red,k}$ being constants.

34. A method as claimed in claim 32, wherein the organic matter burial efficiency $BE_k$ is determined using a relation as follows: $BE_k=BE_{Ox,k}\cdot BE_{Red,k}$.

35. A method as claimed in claim 31, wherein the organic matter burial efficiency $BE_{Red,k}$ in reduction zones is determined using a formula as follows: $BE_{Red,k}=(a_{Red,k}+b_{Red,k}\cdot v_s)^{n_{Red,k}}$ with $v_s$ being the sedimentation rate, and $a_{Red,k}$, $b_{Red,k}$ and $n_{Red,k}$ being constants.

36. A method as claimed in claim 35, wherein organic matter burial efficiency $BE_k$ is determined using a relation as follows: $BE_k = BE_{Ox,k} \cdot BE_{Red,k}$.

37. A computer program product stored on a non-transitory computer readable storage medium comprising program code which when executed on a computer or processor performs a method of developing a sedimentary basin, using qualification of hydrocarbon potential of the sedimentary basin is constructed, comprising:

breaking up the sedimentary basin into geologic layers with each geologic layer corresponding to a sediment deposition for a given time period;

determining a composition of the geologic layers through coupling of a stratigraphic simulation with an organic matter production and degradation model by using an iterative stratigraphic simulation, from a past to a more recent time, within each geologic layer, by use of a stratigraphic model and the organic matter production and degradation model, by determining production of the organic matter within the geologic layer using the organic matter production and degradation model; modelling transport of sediments and the organic matter production using the stratigraphic model, determining degradation of the organic matter during the transport using the organic matter production and degradation model, determining stratigraphy of the basin by accounting for mass conservation by use of the transport of sediments and the degradation of organic matter, and determining organic matter degradation within the stratigraphy using the organic matter production and degradation model;

quantifying hydrocarbon potential of the geologic layers of the sedimentary basin from the composition; and developing the sedimentary basin according to the quantification of the hydrocarbon potential to extract hydrocarbons from the sedimentary basin including at least one of performing exploratory drilling and performing exploitation drilling in a least one zone having a best potential for producing hydrocarbons in the sedimentary basin.

* * * * *